US010860876B2

(12) United States Patent
Hara

(10) Patent No.: US 10,860,876 B2
(45) Date of Patent: Dec. 8, 2020

(54) IMAGE PRESENTATION SYSTEM, IMAGE PRESENTATION METHOD, PROGRAM, AND RECORDING MEDIUM

(71) Applicant: FUJIFILM Corporation, Tokyo (JP)

(72) Inventor: Shigeharu Hara, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 16/287,219

(22) Filed: Feb. 27, 2019

(65) Prior Publication Data

US 2019/0205685 A1      Jul. 4, 2019

Related U.S. Application Data

(63) Continuation of application No. PCT/JP2018/048521, filed on Dec. 28, 2018.

(30) Foreign Application Priority Data

Dec. 28, 2017    (JP) ................................ 2017-253503

(51) Int. Cl.
    *G06K 9/00*    (2006.01)
    *G06K 9/20*    (2006.01)
    (Continued)

(52) U.S. Cl.
    CPC .......... *G06K 9/2081* (2013.01); *G06F 16/54* (2019.01); *G06F 16/58* (2019.01);
    (Continued)

(58) Field of Classification Search
    USPC ....................................................... 382/103
    See application file for complete search history.

(56) References Cited

U.S. PATENT DOCUMENTS

| 2005/0096084 A1* | 5/2005 | Pohja ..................... G06Q 10/10 455/556.1 |
| 2013/0013683 A1* | 1/2013 | Elliott .................. G06Q 10/101 709/204 |

(Continued)

FOREIGN PATENT DOCUMENTS

| JP | 2004220420 A | 8/2004 |
| JP | 5023398 B2 | 9/2012 |
| JP | 2017068703 A | 4/2017 |

OTHER PUBLICATIONS

An Office Action mailed by the Japanese Patent Office dated May 12, 2020, which corresponds to Japanese Design Application No. 2019-508977 with English translation.
(Continued)

*Primary Examiner* — Stephen P Coleman
(74) *Attorney, Agent, or Firm* — Studebaker & Brackett PC

(57) ABSTRACT

Provided are an image presentation system, an image presentation method, a program, and a recording medium that perform a desired process by designating a specific image by each participant from plural images captured by plural participants who participate in an event and a companion. In the image presentation system, the image presentation method, the program, and the recording medium, plural images captured by participants in an event and a companion are acquired and stored, the images are analyzed, analysis tag information is assigned to each image on the basis of an analysis result of each image, designation tag information that is designated by each participant is acquired as a command of each participant, an image to which analysis tag information that matches the designation tag information designated by each participant is assigned from the plural images is extracted as an extraction image for each partici-
(Continued)

pant, and the extraction image for each participant is presented to each participant.

22 Claims, 6 Drawing Sheets

(51) Int. Cl.
    *G06K 9/60*           (2006.01)
    *G06Q 30/06*         (2012.01)
    *G06F 16/54*         (2019.01)
    *G06F 16/58*         (2019.01)

(52) U.S. Cl.
    CPC ........... *G06F 16/5866* (2019.01); *G06K 9/60* (2013.01); *G06Q 30/0601* (2013.01)

(56) References Cited

U.S. PATENT DOCUMENTS

| | | | | |
|---|---|---|---|---|
| 2013/0329060 | A1* | 12/2013 | Yim | H04N 5/2621 |
| | | | | 348/207.1 |
| 2014/0368621 | A1* | 12/2014 | Michiyama | H04N 5/23216 |
| | | | | 348/50 |
| 2016/0307048 | A1* | 10/2016 | Krishnamoorthy | H04N 5/247 |
| 2018/0089746 | A1* | 3/2018 | Cooke | G06Q 30/0635 |

OTHER PUBLICATIONS

International Search Report issued in PCT/JP2018/048521; dated Mar. 12, 2019.
Written Opinion issued in PCT/JP2018/048521; dated Mar. 12, 2019.

\* cited by examiner

IMAGE PRESENTATION SYSTEM, IMAGE PRESENTATION METHOD, PROGRAM, AND RECORDING MEDIUM

CROSS-REFERENCE TO RELATED APPLICATIONS

This application is a Continuation of PCT International Application No. PCT/JP2018/048521 filed on Dec. 28, 2018, which claims priority under 35 U.S.C. § 119(a) to Japanese Patent Application No. 2017-253503, filed on Dec. 28, 2017. The above application is hereby expressly incorporated by reference, in its entirety, into the present application.

BACKGROUND OF THE INVENTION

1. Field of the Invention

The present invention relates to an image presentation system, an image presentation method, a program, and a recording medium that present a plurality of images captured by a plurality of participants who participate in an event and a companion such as a professional cameraman to the participants.

2. Description of the Related Art

In an event in which a plurality of participants participate, such as a wedding reception, a service capable of sharing a plurality of images captured by the plurality of participants and a companion such as a professional cameraman and displaying using a projector or the like and downloading the plurality of images has been provided by a variety of companies.

Such a service may also be used in a variety of events in which a plurality of participants participate, such as a travel tour, as well as the wedding reception.

In this regard, JP2004-220420A and Japanese Patent No. 5023398 relate to the present invention.

SUMMARY OF THE INVENTION

On the other hand, in such a service, for example, as in images or the like including a bride and a groom, and a specific subject in the case of a wedding reception, or as in images or the like including a famous sight and a specific subject in the case of a travel tour, it is considered that there is a need for selecting and downloading a specific image by each participant from a plurality of images captured by a plurality of participants and a companion such as a professional cameraman, a need for ordering printing of such an image, or a need for ordering creation of a photo album (photo book), for example, but such a need has not been realized.

An object of the invention is to provide an image presentation system, an image presentation method, a program, and a recording medium capable of designating a specific image by each participant from a plurality of images captured by a plurality of participants who participate in an event and a companion to perform a desired process.

According to an aspect of the invention, there is provided an image presentation system comprising: an image acquisition section that acquires a plurality of images captured by a plurality of participants who participate in an event and one or more companions who accompany the event; an image storage section that stores the plurality of images; an image analysis section that analyzes each of the plurality of images stored in the image storage section; a tag information assignment section that assigns analysis tag information to each of the images on the basis of an analysis result of each of the images; a command acquisition section that acquires designation tag information that is tag information designated by each of the participants as a command of each of the plurality of participants; an image extraction section that extracts an image to which analysis tag information that matches the designation tag information designated by each of the participants is assigned from the plurality of images stored in the image storage section, as an extraction image for each of the participants; and an image presentation section that presents the extraction image for each of the participants to each of the participants.

Here, it is preferable that the command acquisition section further acquires designation image information that is information on an image designated from the extraction images for each of the participants by each of the participants, as the command of each of the participants, and the image presentation system further comprises an order reception section that receives an order for at least one of downloading of an image corresponding to the designation image information from the extraction images for each of the participants or printing of the image corresponding to the designation image information.

Further, it is preferable that the image presentation system further comprises: an image selection section that selects an image on the basis of the analysis result of each of the images from the extraction images for each of the participants, as a candidate image for each of the participants; and a composite image generation section that generates a composite image for each of the participants using the candidate image for each of the participants, in which the image presentation section further presents the composite image for each of the participants to each of the participants.

Further, it is preferable that the image analysis section calculates an evaluation score of each of the images by changing an amount of weighting of evaluation of an image between an image captured by a professional cameraman who is the companion and an image captured by each of the participants on the basis of the analysis result of each of the images, and the image selection section selects an image on the basis of the evaluation score of each of the images from the extraction images for each of the participants.

Further, it is preferable that the command acquisition section further acquires image editing information for commanding editing of the composite image for each of the participants, as the command of each of the participants, and the image presentation system further comprises an image editing section that edits the composite image for each of the participants in accordance with the image editing information for each of the participants to generate an edited composite image for each of the participants, and an order reception section that receives an order for at least one of downloading of the edited composite image for each of the participants or printing of the edited composite image.

Further, it is preferable that the image presentation system further comprises: an identifier assignment section that assigns, to each image before being acquired by the image acquisition section, an identifier of a person who captures each image; and a fee calculation section that calculates a fee for the order, in which the fee calculation section sets an image of each of the participants and an image of the companion to have different fees on the basis of the identifier to calculate the fees.

Further, it is preferable that the image acquisition section acquires an image of the companion uploaded from a communication device in which an image captured by a digital camera possessed by the companion is stored, and the identifier assignment section uses information on a device type of the digital camera, included in accessory information on each of the images, as the identifier.

Further, it is preferable that the image acquisition section acquires an image of the companion uploaded from a communication device in which an image captured by a digital camera possessed by the companion is stored, and the identifier assignment section uses information on the companion set in an uploading dedicated application for uploading an image to the image acquisition section from the communication device, as the identifier.

According to another aspect of the invention, there is provided an image presentation system comprising: an image acquisition section that acquires a plurality of images captured by a plurality of participants who participate in an event and one or more companions who accompany the event; an image storage section that stores the plurality of images; an image analysis section that analyzes each of the plurality of images stored in the image storage section; a tag information assignment section that assigns analysis tag information to each of the images on the basis of an analysis result of each of the images; an identifier assignment section that assigns, to each image before being acquired by the image acquisition section, an identifier of a person who captures each image; a preference determination section that determines a preference of each of the participants on the basis of the identifier of each of the plurality of participants and the analysis result of each of the images; a command acquisition section that acquires designation tag information that is tag information designated by each of the participants as a command of each of the participants; an image extraction section that extracts an image to which analysis tag information that matches the designation tag information designated by each of the participants is assigned and which matches the preference of each of the participants, from the plurality of images stored in the image storage section, as an extraction image for each of the participants; and an image presentation section that presents the extraction image for each of the participants to each of the participants.

Here, it is preferable that the command acquisition section further acquires designation image information that is information on an image designated from the extraction images for each of the participants by each of the participants, as the command of each of the participants, and the image presentation system further comprises an order reception section that receives an order for at least one of downloading of an image corresponding to the designation image information from the extraction images for each of the participants or printing of the image corresponding to the designation image information.

Further, it is preferable that the image presentation system further comprises: an image selection section that selects an image on the basis of the analysis result of each of the images from the extraction images for each of the participants, as a candidate image for each of the participants; and a composite image generation section that generates a composite image for each of the participants using the candidate image for each of the participants, in which the image presentation section further presents the composite image for each of the participants to each of the participants.

Further, it is preferable that the image analysis section calculates an evaluation score of each of the images by changing an amount of weighting of evaluation of an image between an image captured by a professional cameraman who is the companion and an image captured by each of the participants on the basis of the analysis result of each of the images, and the image selection section selects an image on the basis of the evaluation score of each of the images from the extraction images for each of the participants.

It is preferable that the command acquisition section further acquires image editing information for commanding editing of the composite image for each of the participants, as the command of each of the participants, and the image presentation system further comprises an image editing section that edits the composite image for each of the participants in accordance with the image editing information for each of the participants to generate an edited composite image for each of the participants, and an order reception section that receives an order for at least one of downloading of the edited composite image for each of the participants or printing of the edited composite image.

Further, it is preferable that the image presentation system further comprises: a fee calculation section that calculates a fee for the order, in which the fee calculation section sets an image of each of the participants and an image of the companion to have different fees on the basis of the identifier to calculate the fees.

It is preferable that the image presentation section that preferentially presents an image to which the identifier of each of the participants is assigned and an image that matches the preference of each of the participants, from the extraction images for each of the participant.

Further, it is preferable that the image storage section stores a face image of each of the participants captured by each of the participants, and the identifier assignment section uses the face image of each of the participants as an identifier of a person who captures the image captured by each of the participants.

Further, it is preferable that the image acquisition section acquires an image of each of the participants, captured by an imaging application installed in a mobile terminal with a camera possessed by each of the participants and uploaded from the imaging application, and the identifier assignment section uses information on each of the participants stored in the mobile terminal of each of the participants as the identifier.

Further, the image acquisition section acquires an image of each of the participants uploaded from a communication device in which an image captured by a digital camera possessed by each of the participants is stored, and the identifier assignment section uses information on each of the participants set in an uploading dedicated application for uploading an image to the image acquisition section from the communication device as the identifier.

Further, it is preferable that the image acquisition section acquires an image of the companion uploaded from a communication device in which an image captured by a digital camera possessed by the companion is stored, and the identifier assignment section uses information on the companion set in an uploading dedicated application for uploading an image to the image acquisition section from the communication device as the identifier.

According to still another aspect of the invention, there is provided an image presentation method comprising: a step of acquiring a plurality of images captured by a plurality of participants who participate in an event and one or more companions who accompany the event, using an image acquisition section; a step of storing the plurality of images, using an image storage section; a step of analyzing each of the plurality of images stored in the image storage section, using an image analysis section; a step of assigning analysis tag information to each of the images on the basis of an analysis result of each of the images, using a tag information assignment section; a step of acquiring designation tag information that is tag information designated by each of the participants as a command of each of the plurality of participants, using a command acquisition section; a step of extracting an image to which analysis tag information that matches the designation tag information designated by each of the participants is assigned from the plurality of images stored in the image storage section, as an extraction image for each of the participants, using an image extraction section; and a step of presenting the extraction image for each of the participants to each of the participants, using an image presentation section.

According to still another aspect of the invention, there is provided an image presentation method comprising: a step of acquiring a plurality of images captured by a plurality of participants who participate in an event and one or more companions who accompany the event, using an image acquisition section; a step of storing the plurality of images, using an image storage section; a step of analyzing each of the plurality of images stored in the image storage section, using an image analysis section; a step of assigning analysis tag information to each of the images on the basis of an analysis result of each of the images, using a tag information assignment section; a step of assigning, to each image before being acquired in the step of acquiring a plurality of images, an identifier of a person who captures each image, using an identifier assignment section; a step of determining a preference of each of the participants on the basis of the identifier of each of the plurality of participants and the analysis result of each of the images, using a preference determination section; a step of acquiring designation tag information that is tag information designated by each of the participants as a command of each of the participants, using a command acquisition section; a step of extracting an image to which analysis tag information that matches the designation tag information designated by each of the participants is assigned and which matches the preference of each of the participants, from the plurality of images stored in the image storage section, as an extraction image for each of the participants, using an image extraction section; and a step of presenting the extraction image for each of the participants to each of the participants, using an image presentation section.

According to still another aspect of the invention, there is provided a program for causing a computer to execute each of the steps of any one of the above-described image presentation methods.

According to still another aspect of the invention, there is provided a computer-readable recording medium having a program for causing a computer to execute each of the steps of any one of the above-described image presentation methods recorded thereon.

According to still another aspect of the invention, there is provided an image presentation system comprising: an image acquisition section that is an interface circuit that acquires a plurality of images captured by a plurality of participants who participate in an event and one or more companions who accompany the event; an image storage section that is a storage that stores the plurality of images; an image analysis section that analyzes each of the plurality of images stored in the image storage section; a tag information assignment section that assigns analysis tag information to each of the images on the basis of an analysis result of each of the images; a command acquisition section that acquires designation tag information that is tag information designated by each of the participants as a command of each of the plurality of participants; an image extraction section that extracts an image to which analysis tag information that matches the designation tag information designated by each of the participants is assigned from the plurality of images stored in the image storage section, as an extraction image for each of the participants; and an image presentation section that is a display that presents the extraction image for each of the participants to each of the participants, in which the image analysis section, the tag information assignment section, the command acquisition section, and the image extraction section are configured by hardware, or by a processor that executes a program.

Further, according to still another aspect of the invention, there is provided an image presentation system comprising: an image acquisition section that is an interface circuit that acquires a plurality of images captured by a plurality of participants who participate in an event and one or more companions who accompany the event; an image storage section that is a storage that stores the plurality of images; an image analysis section that analyzes each of the plurality of images stored in the image storage section; a tag information assignment section that assigns analysis tag information to each of the images on the basis of an analysis result of each of the images; an identifier assignment section that assigns, to each image before being acquired by the image acquisition section, an identifier of a person who captures each image; a preference determination section that determines a preference of each of the participants on the basis of the identifier of each of the plurality of participants and the analysis result of each of the images; a command acquisition section that acquires designation tag information that is tag information designated by each of the participants as a command of each of the participants; an image extraction section that extracts an image to which analysis tag information that matches the designation tag information designated by each of the participants is assigned and which matches the preference of each of the participants, from the plurality of images stored in the image storage section, as an extraction image for each of the participants; and an image presentation section that is a display that presents the extraction image for each of the participants to each of the participants, in which the image analysis section, the tag information assignment section, the identifier assignment section, the preference determination section, the command acquisition section, and the image extraction section are configured by hardware, or by a processor that executes a program.

According to the invention, it is possible to perform a desired process such as a process of downloading an image designated by each participant from a plurality of images captured by a plurality of participants who participate in an event and one or more companions, a process of ordering printing, or a process of ordering creation of a composite image such as a photo album using the images designated by each participant or an image designed by each participant while matching the preference of each participant. Accordingly, it is possible to provide an image that each participant wants from the plurality of images.

DESCRIPTION OF THE PREFERRED EMBODIMENTS

Hereinafter, an image presentation system, an image presentation method, a program, and a recording medium of the embodiment of the invention will be described in detail on the basis of suitable embodiments shown in the accompanying drawings.

Figure 1:
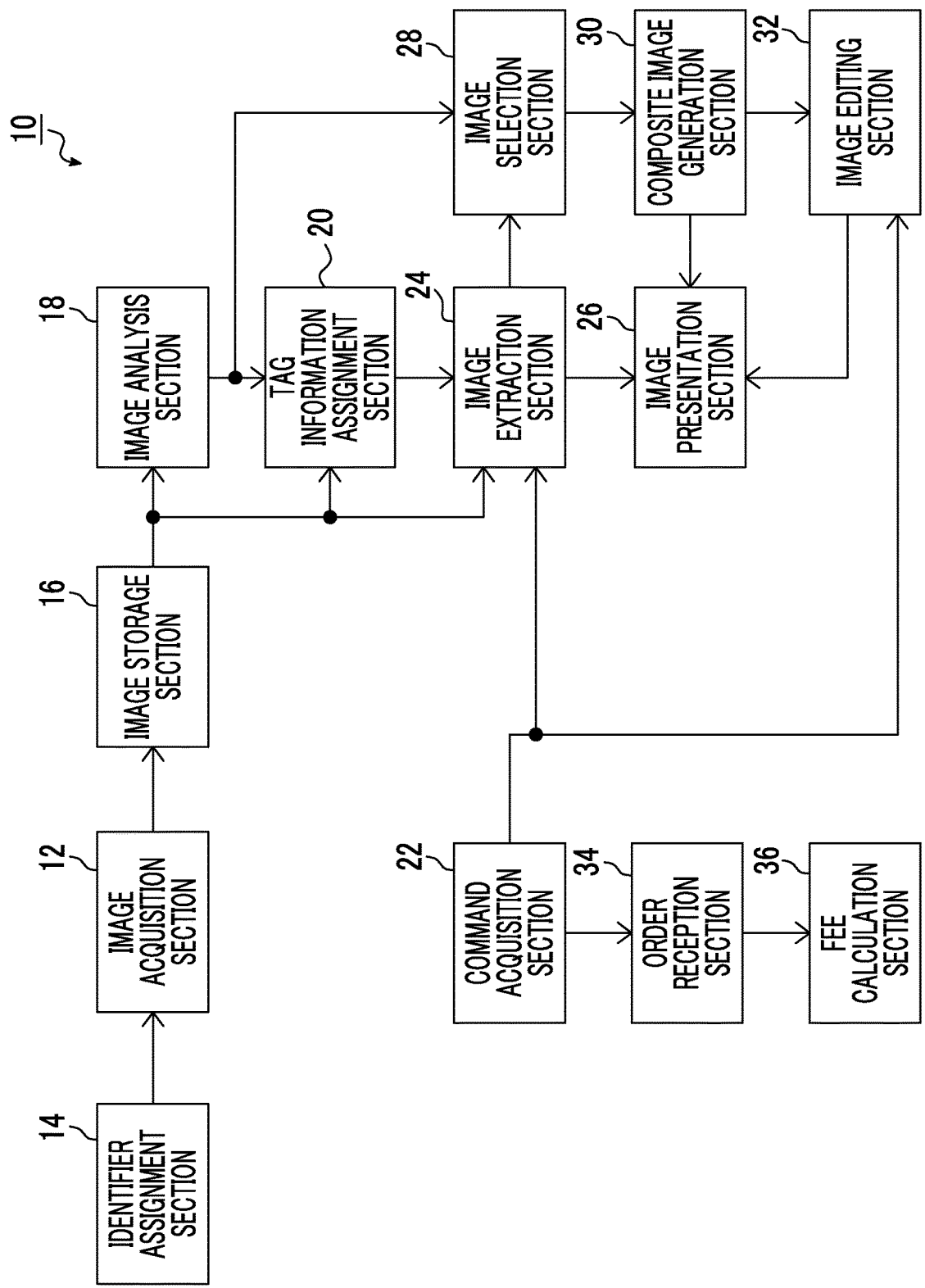
FIG. 1 is a block diagram showing a configuration of an image presentation system according to a first embodiment of the invention.

FIG. 1 is a block diagram showing a configuration of an image presentation system according to a first embodiment of the invention. An image presentation system 10 shown in FIG. 1 presents a plurality of images captured by participants and a companion in an event to the participants, and includes an image acquisition section 12, an identifier assignment section 14, an image storage section 16, an image analysis section 18, a tag information assignment section 20, a command acquisition section 22, an image extraction section 24, an image presentation section 26, an image selection section 28, a composite image generation section 30, an image editing section 32, an order reception section 34, and a fee calculation section 36.

In the image presentation system 10, the image acquisition section 12 acquires a plurality of images (photos) captured by a plurality of participants who participate in an event and one or more companions who accompany the event.

The event includes a variety of events in which a plurality of persons participate, which is not particularly limited and may be a wedding reception, a travel tour, or the like, for example.

The participants are persons who participate in an event. For example, in the case of a wedding reception, the participants may be a bride and a groom, parents, relatives, friends, fellow workers, and the like.

The companion is an organizer of the event or a person who is designated by the organizer and accompanies the event. For example, in the case of a travel tour, the companion may include a professional cameraman who captures images (photos) of a crew member and participants.

The image acquisition section 12 is an interface circuit that acquires images through wired communication or wireless communication.

In a case where an image is captured by a camera function (an imaging application installed in a mobile terminal with a camera) of a smartphone (a mobile terminal with a camera) possessed by each participant and a companion, the image acquisition section 12 may acquire an image uploaded (transmitted) from the smartphone using a wireless communication function of the smartphone, for example.

On the other hand, in a case where an image is captured by a digital camera possessed by each participant and a companion, for example, the image is captured by the digital camera and is recorded on a recording medium such as a memory card is imported and stored in a communication device having a wired or wireless communication function, such as a personal computer (PC), a notebook PC, or the like. The image acquisition section 12 may acquire an image uploaded from the communication device using a wireless function. Further, in a case where the digital camera or the recording medium includes the communication function, the image acquisition section 12 may directly acquire an image uploaded from the digital camera or the recording medium.

A timing when an image is acquired is not particularly limited, but for example, an image may be acquired whenever the image is captured, or an image may be periodically acquired. Alternatively, images may be collectively acquired immediately before an event is terminated. Further, in the case of an event over a couple of days such as a travel tour, for example, an image may be acquired at night at a hotel that is an overnight stay. In a facility where wireless fidelity (Wi-Fi) is freely provided, such as a hotel, a communication function may be used without considering a smartphone data traffic, a battery residual capacity, a communication speed, or the like.

Further, the identifier assignment section 14 assigns, to each image before being acquired by the image acquisition section 12, that is, to each image captured by each of participants and companions, an identifier of a person who captures each image.

In a case where an image is captured by a camera function of a smartphone, for example, a different identifier is assigned to each participant through an imaging application installed in the smartphone. On the other hand, in a case where an image is captured by a digital camera, a different identifier is assigned to each of participants and companions through an uploading dedicated application for uploading images from a communication device to the image storage section 16, installed in the communication device in which images captured by the digital camera are stored.

The imaging application and the uploading dedicated application that serve as the identifier assignment section 14 may automatically generate and assign a different identifier to each of participants and companions.

Further, in a case where the image acquisition section 12 acquires an image of each of participants and companions, uploaded from a communication device in which images captured by a digital camera possessed by each of the participants and companions are stored, the identifier assignment section 14 may use information on the device type of a digital camera included in accessory information on each image as an identifier. Alternatively, the identifier assignment section 14 may use a unique identifier input from each of participants and companions.

In a case where a face image of each participant captured by each participant is stored in the image storage section 16, the identifier assignment section 14 may use the face image of each participant stored in the image storage section 16 as an identifier of a person who captures images captured by each participant.

In a case where the image acquisition section 12 acquires an image of each participant, captured by an imaging application installed in a smartphone possessed by each participant and uploaded from the imaging application, the identifier assignment section 14 may use information on each participant stored in the smartphone of each participant, for example, a phone number, a mail address, or the like as an identifier.

In using the image presentation system 10, for example, each of participants and companions registers different information for each of the participants and companions, such as a mail address or a user name.

Accordingly, in a case where different information on each participant is set in an uploading dedicated application, and in a case where the image acquisition section 12 acquires an image of each participant uploaded from a communication device in which images captured by a digital camera possessed by each participant are stored, the identifier assignment section 14 may use information on each participant set in the uploading dedicated application as an identifier.

Similarly, in a case where the image acquisition section 12 acquires an image of a companion uploaded from a communication device in which images captured by a digital camera possessed by each companion are stored, the identifier assignment section 14 may use information on the companion set in the uploading dedicated application as an identifier.

A method for assigning identifiers to images by the identifier assignment section 14, and a method for generating or acquiring identifiers are not particularly limited. Further, in the image presentation system 10 according to the first embodiment, it is not essential that an identifier is assigned to an image.

Further, the image storage section 16 stores a plurality of images acquired by the image acquisition section 12, that is, a plurality of images captured by a plurality of participants and one or more companions.

The image storage section 16 is a storage such as a cloud storage, for example.

In a case where an image is captured by a camera function of a smartphone, the image is uploaded and stored into the image storage section 16 such as a cloud storage through a network such as the Internet from the smartphone using a wireless communication function of the smartphone. Further, in a case where an image is captured by a digital camera, the image is imported in a communication device from a storage medium of the digital camera, and similarly, is uploaded and stored into the image storage section 16 from the communication device.

Further, the image analysis section 18 analyzes each of a plurality of images stored in the image storage section 16.

The image analysis includes analysis of image content of person's face detection/face recognition, object recognition other than person recognition (wedding hall panorama, wedding cake, bouquet, or the like), scene recognition (night scene, sea, autumn leaves, sandy beach, sky, or the like), and the like, analysis of image quality of image brightness, tint, contrast, and blurriness level, analysis of imaging date and time and an imaging location included in image accessory information of an exchangeable image file format (Exif) or the like, and the like, as analysis items.

Further, the image analysis section 18 may perform image processing such as people classification for classifying a plurality of images into a participant group on the basis of an analysis result of face detection/face recognition, scene classification for classifying a plurality of images into a scene group on the basis of an analysis result of scene recognition, date and time information classification for classifying a plurality of images into an imaging date and time group on the basis of information on imaging date and time, position information classification for classifying a plurality of images into an imaging location group on the basis of information on an imaging location, calculation of an evaluation score for each image and each analysis item and a total evaluation score of all analysis items on the basis of an analysis result of images, or the like.

Here, it is considered that an image captured by a professional cameraman is generally an image having high quality, for example, good image quality, composition, and the like, compared with an image captured by each participant. According to this, when each participant orders creation of a composite image such as a photo album, at evaluation of each image, for example, calculation of an evaluation score for each analysis item and a total evaluation score by the image analysis section 18, the evaluation score of each image may be calculated by changing an amount of weighting of evaluation of an image between an image captured by a professional cameraman and an image captured by each participant. For example, the amount of weighting of an image captured by a professional cameraman may be made larger than the amount of weighting of an image captured by each participant. On the other hand, it is also considered that for the purpose of enhancing handmade feeling and unexpectedness by adopting many images captured by each participant, the amount of weighting of an image captured by each participant may be made larger than the amount of weighting of an image captured by a professional cameraman.

The image analysis item and the analysis method are not particularly limited, and may use various image analysis items and analysis methods.

Further, the tag information assignment section 20 assigns analysis tag information to each image on the basis of an analysis result of each image in the image analysis section 18.

The tag information assignment section 20 assigns an associated name to each image as the analysis tag information. For example, as an object recognition result, in a case where it is determined that a "flower" is taken in an image, analysis tag information indicating "flower" is assigned to the image. As a scene recognition result, in a case where it is determined that a scene of "sea" is taken in an image, analysis tag information indicating "sea" is assigned to the image. Further, tag information indicating a certain name input by a user may be assigned to an image. In addition, a plurality of pieces of analysis tag information may be assigned to one image.

A method for assigning analysis tag information by the tag information assignment section 20 and a name of analysis tag information to be assigned are not particularly limited.

Further, the command acquisition section 22 acquires a command input by each participant, as the command of each participant.

In the case of this embodiment, the command acquisition section 22 acquires designation tag information from a smartphone, a PC, or the like of each participant, and also acquires image editing information, designation image information, and the like (which will be described later).

The designation tag information refers to tag information designated by each participant as a command of each participant, in order to designate an image for performing a process of performing downloading (receiving) by each participant, a process of ordering printing, or a process of ordering creation of a composite image such as a photo album, for example, from a plurality of images stored in the image storage section 16.

In a case where a preferred image is designated from a predetermined number of images displayed as a list (displayed in a reduced size) by a participant, the designation tag information may employ a name corresponding to an image, or may be a graph in which whether the image is selected or not is indicated by 1 or 0. Further, in a case where a participant designates a preferred object (a general object name such as a "mountain", a proper object name such as "Mt. Fuji", a face image obtained by an image analysis result, a person, an account, or the like), a name corresponding to the object may be used.

Further, as the designation tag information, a participant may select and designate one piece of tag information from a tag information list, or may an input text of a certain name. Alternatively, a combination of both the two may be used. That is, first, a tag information list is displayed, and in a case where tag information desired by a participant is not present in the list as designation tag information, the participant may input a text of a certain name.

A method for designating designation tag information by a participant is not particularly limited.

Further, the image extraction section 24 extracts an image to which analysis tag information that matches the designation tag information designated by each participant is assigned, from a plurality of images stored in the image storage section 16, as an extraction image for each participant.

The extraction image for each participant is an image to be used for performing a process of performing downloading by each user, a process of ordering printing, or a process of ordering creation of a composite image such as a photo album, for example.

Further, the image presentation section 26 presents an extraction image for each participant extracted by the image extraction section 24 to each participant. Further, the image presentation section 26 presents a composite image for each participant generated by the composite image generation section 30 to each participant.

The image presentation section 26 is an image display device, which is not particularly limited, but for example, may employ a display for a smartphone, a PC, a notebook PC, or a tablet PC, such as a liquid crystal display.

Further, the image selection section 28 may select an image on the basis of an analysis result of each image from extraction images for each participant, as a candidate image for each participant, in order to create a composite image such as a photo album. The image selection section 28 can select an image on the basis of an evaluation score of each image, for example, an evaluation score for each analysis item and a total evaluation score from extraction images for each participant, as a candidate image for each participant.

The candidate image is an image used in a composite image for each user, automatically generated by the composite image generation section 30.

A method for selecting an image by the image selection section 28 is not particularly limited, but for example, an image in which a person and an object are taken to be larger than those in different images, an image of which a total evaluation score is higher than those of different images, that is, an image with high image quality, or the like may be preferentially selected.

Further, the composite image generation section 30 generates a composite image for each participant using a candidate image for each participant selected by the image selection section 28.

A method for generating a composite image by the composite image generation section 30 is not particularly limited, but for example, in a case where a photo album is generated as a composite image, the photo album is generated by automatically laying out candidate images on each page of the photo album.

Further, the image editing section 32 edits a composite image for each participant generated by the composite image generation section 30 in accordance with image editing information for each participant acquired by the command acquisition section 22 to generate an edited composite image for each participant.

The image editing information is information for commanding editing of a composite image for each participant, as a command of each participant.

A method for editing a composite image by the image editing section 32 is not particularly limited, but for example, in a case where a photo album is edited as a composite image, an edited photo album is generated by performing rearrangement of extraction images arranged on each page of the photo album automatically generated by the composite image generation section 30, change of sizes, and the like.

Further, the order reception section 34 receives an order for at least one of downloading of an image (data) corresponding to designation image information acquired by the command acquisition section 22 from extraction images for each participant or printing of the image corresponding to the designation image information, in accordance with a command of each participant. Further, the order reception section 34 receives an order for at least one of downloading of an edited composite image (data) for each participant or printing of the edited composite image, in accordance with a command of each participant.

The designation image information is information on an image designated from extraction images for each participant by each participant, as a command of each participant, in order to perform an order for at least one of image downloading or printing.

Further, the fee calculation section 36 calculates a fee with respect to an order received by the order reception section 34.

The fee calculation section 36 may set an image of each participant and an image of a companion to have different fees to calculate the fees, on the basis of an identifier assigned to each image by the identifier assignment section 14. It is considered that an image captured by a professional cameraman is an image having good image quality, composition, and the like, compared with an image captured by each participant. Accordingly, it is considered that the price of the image captured by the professional cameraman is set to be higher than that of the image captured by each participant.

Further, although the fees may be or may not be interlocked with weighting of evaluation of an image, in a case where an image captured by a professional cameraman is used for a composite image, the fees may be increased, or in reverse, decreased depending on the number of images used. This allows each participant to be guided to a direction that each participant wants to use an image captured by each participant for a composite image or a direction that each participant wants to use an image captured by a professional cameraman for a composite image.

Figure 2:
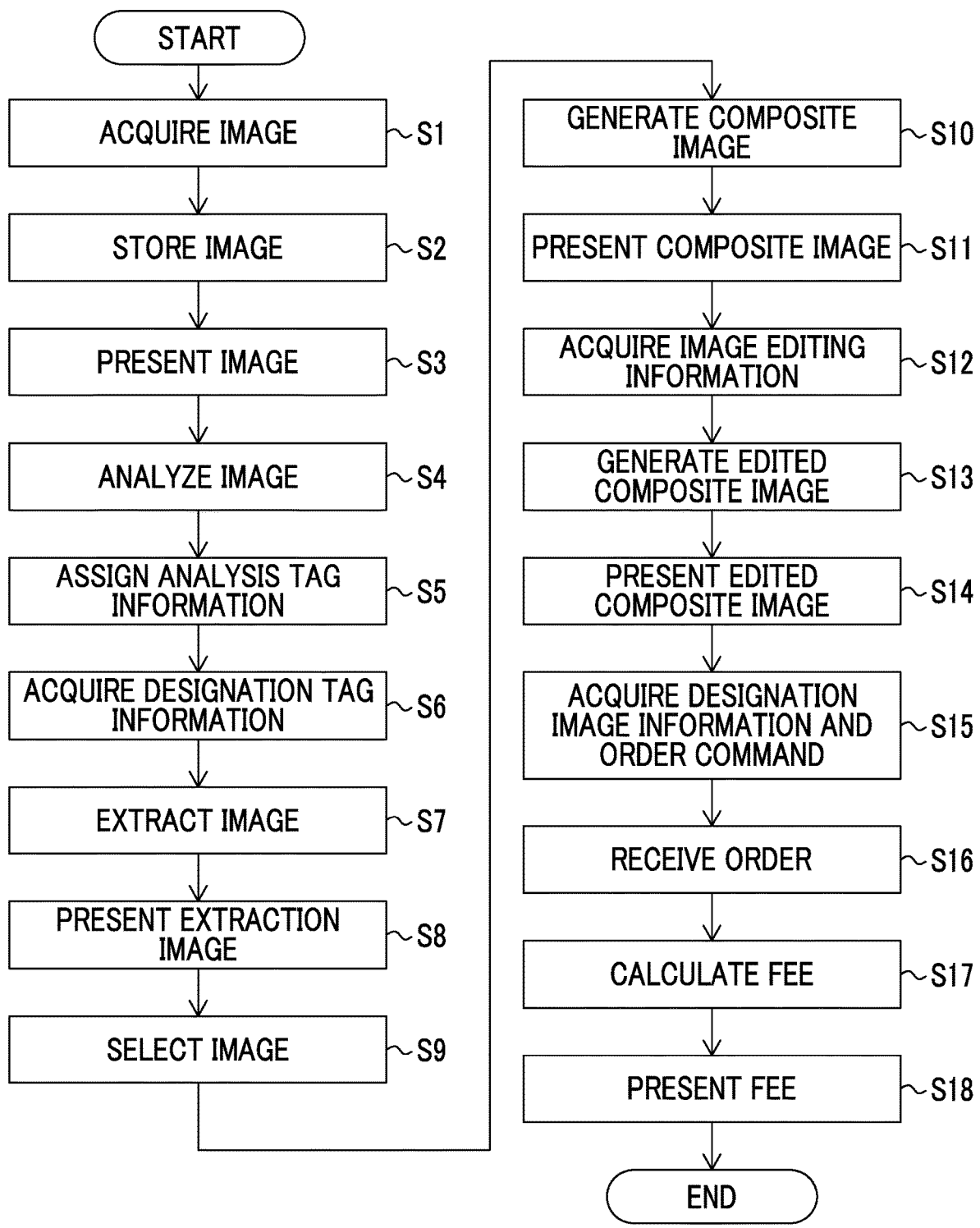
FIG. 2 is a flowchart illustrating an operation of the image presentation system shown in FIG. 1.

Next, an operation of the image presentation system 10 will be described with reference to a flowchart shown in FIG. 2.

In an event such as a wedding reception or a travel tour, each participant who participates in the event and a companion such as a professional cameraman capture various images using a camera function of a smartphone and an imaging device such as a digital camera.

Figure 3:
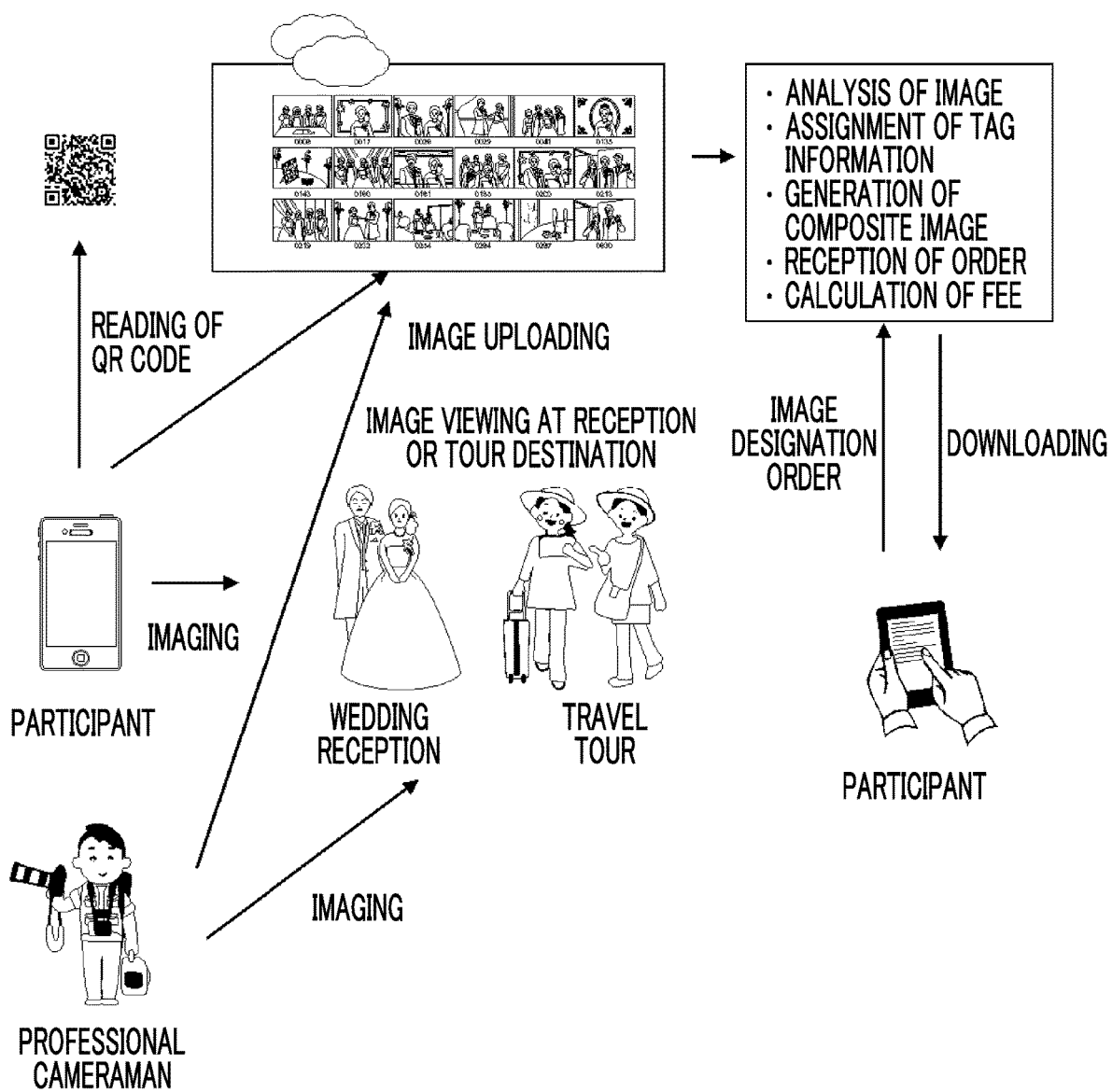
FIG. 3 is a conceptual diagram showing the operation of the image presentation system shown in FIG. 1.

For example, in a case where each of the participants and companions captures images using the camera function of the smartphone, as shown in FIG. 3, each of the participants and companions reads a quick response (QR) code (registered trademark) from a card of a name card size that is distributed beforehand. In the QR code, an address of a website of a downloading destination of an imaging application for the smartphone, an address of an uploading destination of an image, and the like, indicated by a uniform resource locator (URL) are stored.

Each of the participants and companions may download the imaging application for the smartphone from the website of the downloading destination, and may capture images using the imaging application.

The card on which the QR code is written may be distributed to each of the participants and companions before an event is started, or may be posted to each of the participants and companions beforehand. Further, it is not essential that the QR code is distributed using a medium such as a card, and for example, a configuration in which an e-mail including the QR code is transmitted to each of the participants and companions and the QR code may be displayed in the e-mail in a case where each of the participants and companions reads the e-mail may be used. Further, it is not essential that the QR code is used.

Further, each of the participants and companions uploads images captured by each of the participants and companions to the image storage section 16 such as a cloud storage through a network such as the Internet, as shown in FIG. 3.

For example, in a case where images are captured by the camera function of the smartphone, each of the participants and companions may upload the images using the imaging application, for example. On the other hand, in a case where an image is captured by a digital camera, each of the participants and companions imports an image recorded on a recording medium of a digital camera into a communication device such as a PC, and uploads the image using an uploading dedicated application installed in the communication device.

Alternatively, each of the participants and companions may upload an image to an address of an uploading destination of the image using a web browser, or the like.

In a case where a plurality of images are uploaded from each of the participants and companions, the plurality of images uploaded from each of the participants and companions are acquired by the image acquisition section 12 (step S1), and are stored in the image storage section 16 (step S2).

Subsequently, the images stored in the image storage section 16 are presented to each participant by the image presentation section 26 (step S3).

That is, each participant may view the images presented by the image presentation section 26, as shown in FIG. 3. For example, in a wedding reception, all of participants can enjoy a plurality of images displayed in a slideshow format using a projector, or the like. Alternatively, each participant can individually view a plurality of images displayed on a display of a smartphone or a communication device such as a PC, for example.

Then, each of the plurality of images stored in the image storage section 16 is analyzed by the image analysis section 18 (step S4), and analysis tag information is assigned to each image on the basis of an analysis result of each image by the tag information assignment section 20 (step S5).

Then, as shown in FIG. 3, in a case where each participant performs a process of downloading an image, ordering printing, and creating a composite image such as a photo album, each participant inputs designation tag information from the smartphone or the communication device such as a PC.

In a case where the designation tag information is input by each participant, the designation tag information designated by each participant is acquired as the command for each participant by the command acquisition section 22 (step S6).

Then, an image to which analysis tag information that matches the designation tag information designated by each participant is assigned is extracted from the plurality of images stored in the image storage section 16 by the image extraction section 24, as the extraction image for each participant (step S7).

Then, extraction images for each participant are presented to each participant by the image presentation section 26 (step S8). For example, a plurality of images are displayed on the display of the smartphone or the communication device such as a PC of each participant.

Then, in order to create a composite image such as a photo album, an image is selected by the image selection section 28 from the extraction images for each participant on the basis of an analysis result of each image, as a candidate image for each participant (step S9).

Then, a composite image for each participant is generated using the candidate image for each participant by the composite image generation section 30 (step S10), and the composite image for each participant is presented to each participant by the image presentation section 26 (step S11). The composite image is displayed on the display of the smartphone or the communication device such as a PC of each participant.

Each participant confirms the composite image presented to each participant, and changes an image or changes the size of the image to edit the composite image, as necessary, for example.

Then, image editing information for each participant is acquired as a command of each participant by the command acquisition section 22 (step S12).

Then, the composite image for each participant is edited in accordance with the image editing information for each participant to generate an edited composite image for each participant by the image editing section 32 (step S13), and the edited composite image for each participant is presented to each participant by the image presentation section 26 (step S14). The edited composite image is displayed on the display of the smartphone or the communication device such as a PC of each participant.

Each participant designates and downloads a desired image from the extraction images for each participant presented to each participant, or inputs a command for ordering printing. Further, each participant confirms the edited composite image for each participant presented to each participant, and downloads the edited composite image for each participant or inputs a command for ordering printing.

Then, designation image information on the image designated by each participant and a command for ordering are acquired as a command of each participant by the command acquisition section 22 (step S15).

Then, an order for at least one of downloading of an image (data) corresponding to the designation image information from the extraction images for each participant and the edited composite image (data) for each participant or printing thereof is received by the order reception section 34, in accordance with the command of each participant (step S16).

Further, a fee for the order of each participant is calculated by the fee calculation section 36 (step S17), and the fee for the order of each participant is presented to each participant by the image presentation section 26 (step S18).

In the image presentation system 10, it is possible to perform a desired process such as a process of downloading an image designated by each participant from a plurality of images captured by a plurality of participants who participate in an event and one or more companions, a process of ordering printing, or a process of ordering creation of a composite image such as a photo album using the images designated by each participant. Accordingly, it is possible to provide an image that each participant wants from the plurality of images.

Figure 4:
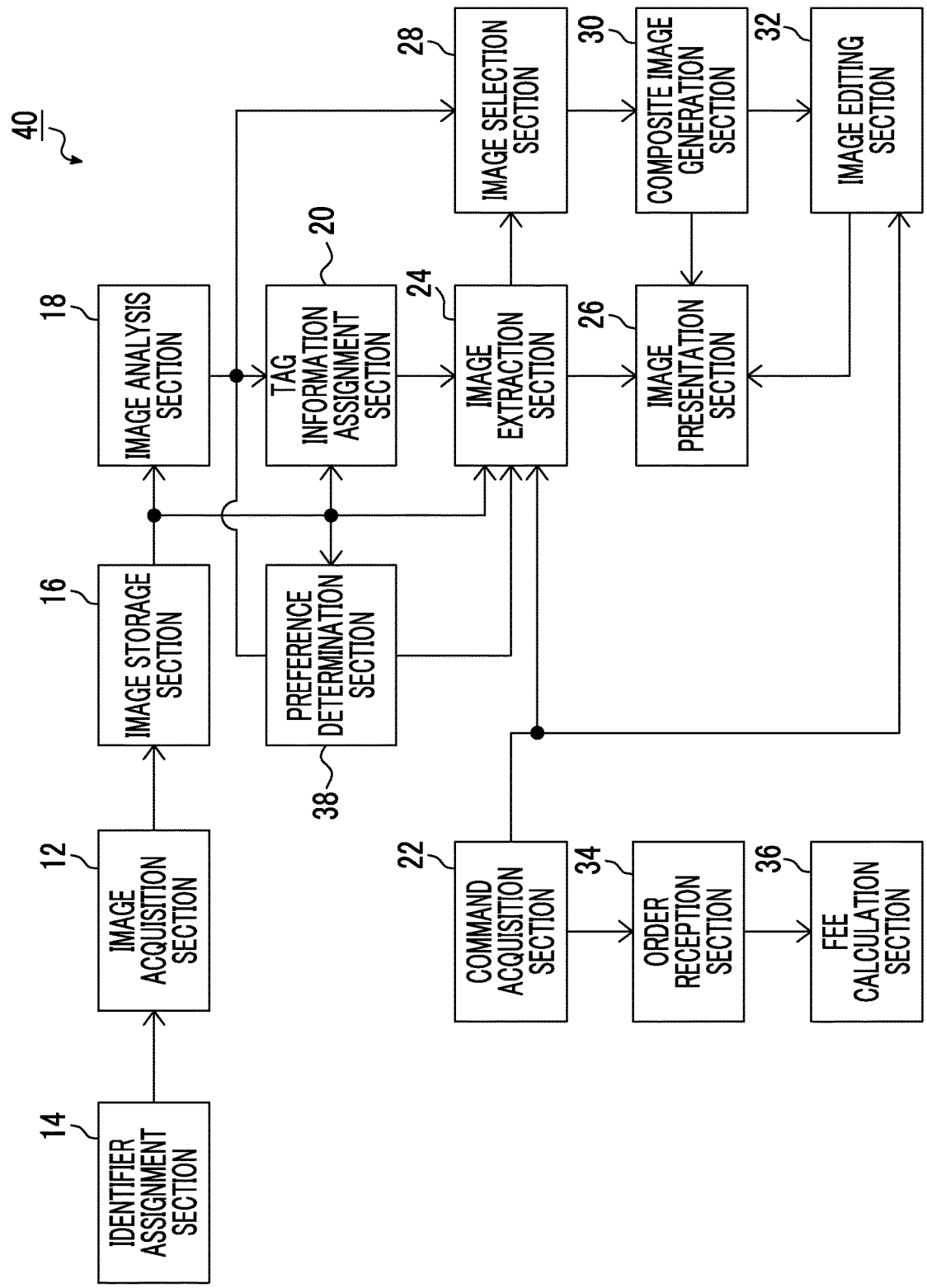
FIG. 4 is a block diagram showing a configuration of an image presentation system according to a second embodiment of the invention.

Next, FIG. 4 is a block diagram showing a configuration of an image presentation system according to a second embodiment of the invention. An image presentation system 40 shown in FIG. 4 further comprises a preference determination section 38 in the image presentation system 10 shown in FIG. 1.

That is, the image presentation system 40 comprises the image acquisition section 12, the identifier assignment section 14, the image storage section 16, the image analysis section 18, the tag information assignment section 20, the command acquisition section 22, the image extraction section 24, the image presentation section 26, the image selection section 28, the composite image generation section 30, the image editing section 32, the order reception section 34, the fee calculation section 36, and the preference determination section 38.

In the image presentation system 40, the preference determination section 38 determines a preference of each participant on the basis of an identifier of each participant and an analysis result of each image.

An image captured by a participant in an event is an image of which a subject is a photographer oneself, or an image that is desired by a photographer, that is, a participant who captures the image. From an image to which an identifier of a certain participant is assigned and an analysis result of the image, for example, in a case where there are a large number of images in which persons are taken among the images to which the identifier of the participant is assigned, the preference determination section 38 may determine a preference of the participant, in such a manner that the participant prefers images in which a person is taken.

Further, similarly, in a case where there are a large number of images of landscapes and there are a large number of images in which objects are taken, it is determined that the participant prefers images of landscapes and images in which objects are taken.

A method for determining a preference of a participant by the preference determination section 38 is not particularly limited.

Figure 5:
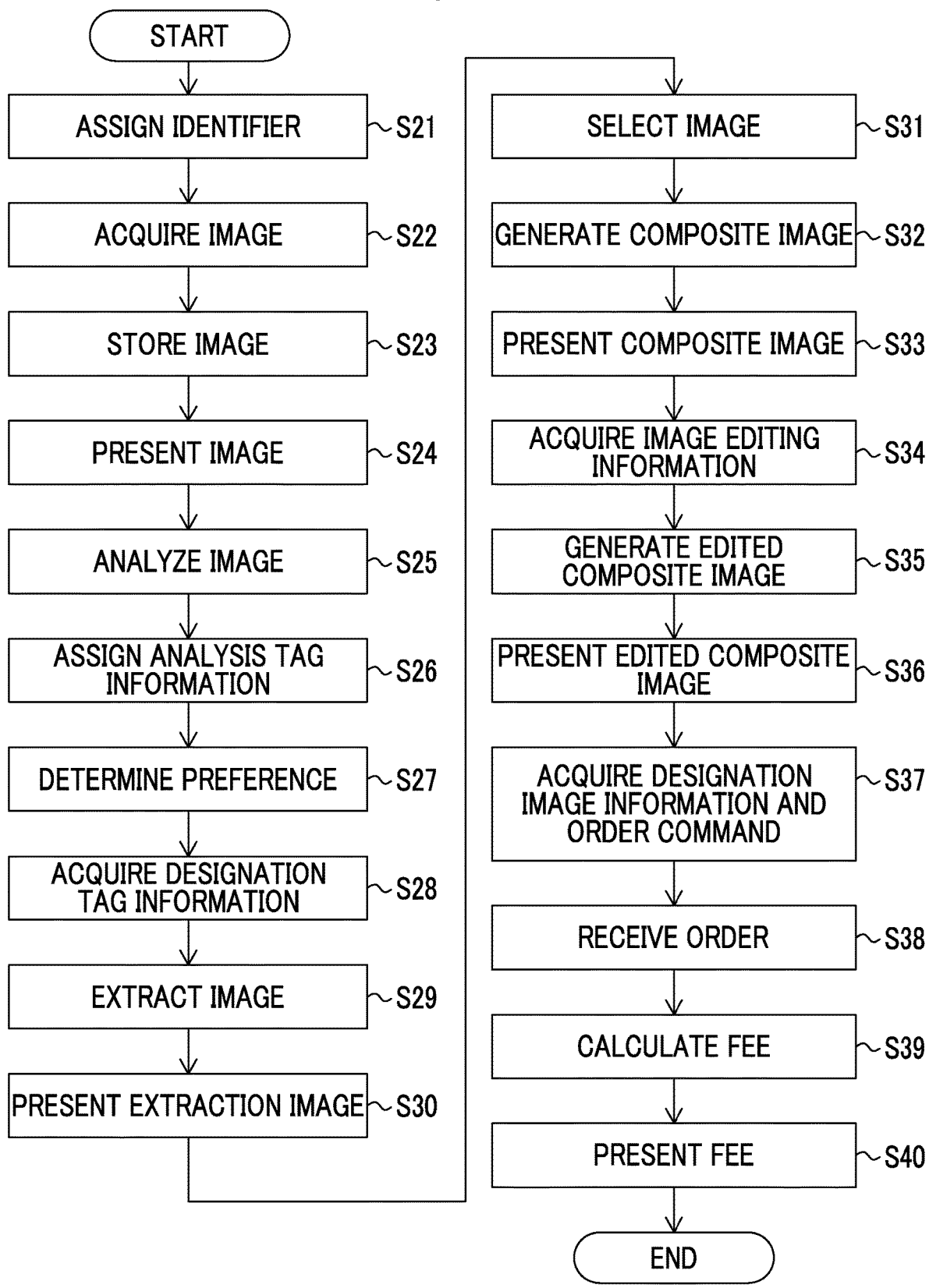
FIG. 5 is a flowchart illustrating an operation of the image presentation system shown in FIG. 4.

Next, an operation of the image presentation system 40 will be described with reference to a flowchart shown in FIG. 5.

In the image presentation system 40, operations from an operation of capturing an image by each of participants and companions and to an operation of uploading the captured image to the image storage section 16 through a network is the same as the operations of the case of the image presentation system 10. Here, in the case of the image presentation system 40, each of the participants and companions installs and uses an imaging application in a smartphone, or installs and uses an uploading dedicated application in a communication device such as a PC, instead of the QR code.

Figure 6:
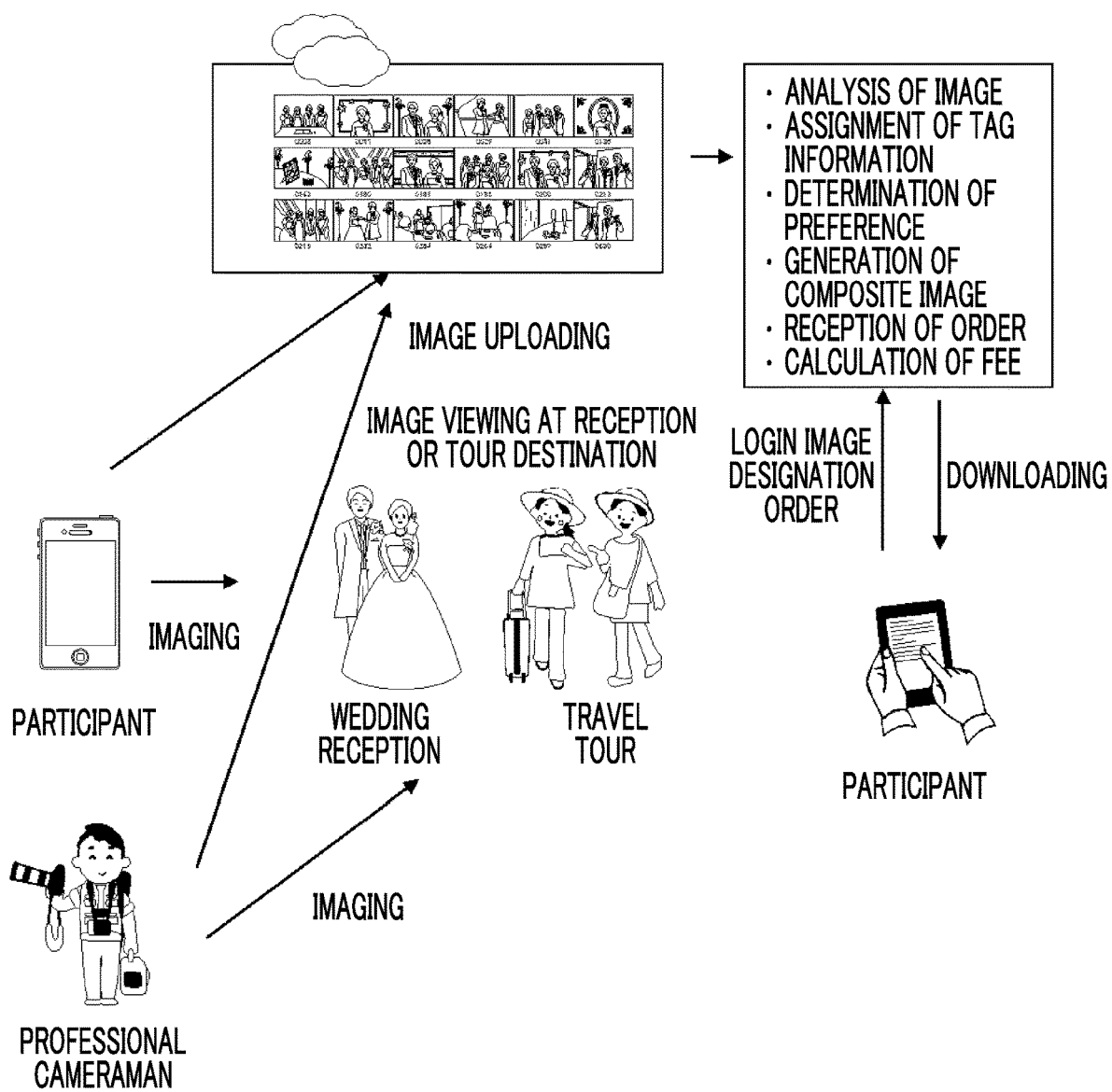
FIG. 6 is a conceptual diagram showing the operation of the image presentation system shown in FIG. 4.

As shown in FIG. 6, before each of the participants and companions uploads an image, that is, before an image is acquired by the image acquisition section 12, an identifier of a person who captures each image is assigned to each image through the imaging application and the uploading dedicated application (step S21).

Further, operations of image acquisition (step S22), image storage (step S23), image presentation (step S24), image analysis (step S25), and analysis tag information assignment (step S26) are the same as steps S1 to S5 in the image presentation system 10.

Then, a preference of each participant is determined on the basis of an identifier of each participant and an analysis result of each image by the preference determination section 38 (step S27).

Then, each of the participants and companions logs in to the image presentation system 40 using information on each of the participants and companions registered beforehand.

Then, an operation of acquiring designation tag information (step S28) is the same as the operation of step S6 in the image presentation system 10.

Further, an image to which analysis tag information that matches the designation tag information designated by each participant is assigned and which matches the preference of each participant is extracted by the image extraction section 24, from the plurality of images stored in the image storage section 16, as an extraction image for each participant (step S29).

Further, the extraction image for each participant is presented to each participant by the image presentation section 26 (step S30).

Here, each of the participants and companions logs in to the image presentation system 40, and the preference of each participant is determined by the preference determination section 38. Accordingly, in a case where the image presentation section 26 presents the extraction image for each participant, the image presentation section 26 may preferentially present an image to which an identifier of each participant is assigned and an image that matches the preference of each participant, from the extraction images for each participant.

Then, operations of image selection (step S31), generation of a composite image (step S32), presentation of the composite image (step S33), acquisition of image editing information (step S34), generation of an edited composite image (step S35), presentation of the edited composite image (step S36), acquisition of a command of designation image information and a command for an order (step S37), reception of the order (step S38), fee calculation (step S39), and fee presentation (step S40) are the same as the operations of steps S9 to S18 in the image presentation system 10.

In the image presentation system 40, it is possible to perform a desired process such as a process of downloading an image designated by each participant from a plurality of images captured by a plurality of participants who participate in an event and one or more companions, a process of ordering printing, or a process of ordering creation of a composite image such as a photo album using an image that is designated by each participant and matches the preference of each participant. Accordingly, it is possible to present an image desired by each participant from the plurality of images.

In the device of the embodiment of the invention, for example, a hardware configuration of processing units that execute various processes, such as the identifier assignment section 14, the image analysis section 18, the tag information assignment section 20, the command acquisition section 22, the image extraction section 24, the image selection section 28, the composite image generation section 30, the image editing section 32, the order reception section 34, the fee calculation section 36, the preference determination section 38, and the like may be dedicated hardware, or may be a variety of processors or a computer that executes a program.

The variety of processors include a central processing unit (CPU) that is a general use processor that functions as a variety of processing units by executing software (program), a programmable logic device (PLD) that is a processor capable of changing a circuit configuration after manufacturing, such as a field programmable gate array (FPGA), a dedicated electric circuit that is a processor having a circuit configuration that is dedicatedly designed for performing a specific process, such as an application specific integrated circuit (ASIC), or the like.

One processing unit may be configured by one processor among the variety of processors described above, or may be configured by a combination of the same type or different types of two or more processors, for example, a combination of a plurality of FPGAs, a combination of an FPGA and a CPU, or the like. Further, a plurality of processing units may be configured by one processor among a plurality of processors. Furthermore, two or more processing units among a plurality of processing units may be collectively configured by one processor.

For example, as represented by a computer such as a server or a client, a configuration in which a combination of one or more CPUs and software forms one processor and this processor functions as a plurality of processing units may be employed. In addition, as represented by a system on chip (SoC) or the like, a configuration in which a processor for realizing entire functions of a system including a plurality of processing units using one integrated circuit (IC) chip is used may be employed.

Further, the hardware configuration of the variety of processors is, more specifically, electric circuitry in which circuit elements such as semiconductors are combined.

In addition, the method of the embodiment of the invention may be executed by a program for causing a computer to execute each of the steps, for example. Further, a computer-readable recording medium on which the program is recorded may be also provided.

Hereinbefore, the invention has been described in detail, but the invention is not limited to the above-mentioned embodiments, and various modifications or changes may be made in a range without departing from the concept of the invention.

EXPLANATION OF REFERENCES 10, 40: image presentation system
12: image acquisition section
14: identifier assignment section
16: image storage section
18: image analysis section
20: tag information assignment section
22: command acquisition section
24: image extraction section
26: image presentation section
28: image selection section
30: composite image generation section
32: image editing section
34: order reception section
36: fee calculation section
38: preference determination section

What is claimed is:

1. An image presentation system comprising a processor, wherein the processor:
acquires a plurality of images captured by a plurality of participants who participate in an event and one or more companions who accompany the event;
stores the plurality of images in an image storage;
analyzes each of the plurality of images stored in the image storage;
assigns analysis tag information to each of the images on the basis of an analysis result of each of the images;
acquires designation tag information that is tag information designated by each of the participants as a command of each of the plurality of participants;
extracts an image to which analysis tag information that matches the designation tag information designated by each of the participants is assigned from the plurality of images stored in the image storage, as an extraction image for each of the participants;
presents the extraction image for each of the participants to each of the participants, and
selects an image on the basis of the analysis result of each of the images from the extraction images for each of the participants, wherein
the processor calculates an evaluation score of each of the images by changing an amount of weighting of evaluation of an image between an image captured by the companion and an image captured by each of the participants on the basis of the analysis result of each of the images, and
selects an image on the basis of the evaluation score of each of the images from the extraction images for each of the participants.

2. The image presentation system according to claim 1, wherein the processor further
acquires designation image information that is information on an image designated from the extraction images for each of the participants by each of the participants, as the command of each of the participants, and
receives an order for at least one of downloading of an image corresponding to the designation image information from the extraction images for each of the participants or printing of the image corresponding to the designation image information.

3. The image presentation system according to claim 1, wherein the processor
selects the image from the extraction images for each of the participants, as a candidate image for each of the participants,
generates a composite image for each of the participants using the candidate image for each of the participants, and
presents the composite image for each of the participants to each of the participants.

4. The image presentation system according to claim 3, wherein the processor
changes the amount of weighting of evaluation of the image between the image captured by a professional cameraman who is the companion and the image captured by each of the participants on the basis of the analysis result of each of the images.

5. The image presentation system according to claim 3, wherein the processor
further acquires image editing information for commanding editing of the composite image for each of the participants, as the command of each of the participants,
edits the composite image for each of the participants in accordance with the image editing information for each of the participants to generate an edited composite image for each of the participants, and
receives an order for at least one of downloading of the edited composite image for each of the participants or printing of the edited composite image.

6. An image presentation system comprising a processor, wherein the processor:
acquires a plurality of images captured by a plurality of participants who participate in an event and one or more companions who accompany the event;
stores the plurality of images in an image storage;
analyzes each of the plurality of images stored in the image storage;
assigns analysis tag information to each of the images on the basis of an analysis result of each of the images;
acquires designation tag information that is tag information designated by each of the participants as a command of each of the plurality of participants;
extracts an image to which analysis tag information that matches the designation tag information designated by each of the participants is assigned from the plurality of images stored in the image storage, as an extraction image for each of the participants; and
presents the extraction image for each of the participants to each of the participants, wherein
the processor further acquires designation image information that is information on an image designated from the extraction images for each of the participants by each of the participants, as the command of each of the participants,
receives an order for at least one of downloading of an image corresponding to the designation image information from the extraction images for each of the participants or printing of the image corresponding to the designation image information,
assigns, to each image of the plurality of images before being acquired, an identifier of a person who captures each image,
calculates a fee for the order, and
sets an image of each of the participants and an image of the companion to have different fees on the basis of the identifier to calculate the fees.

7. The image presentation system according to claim 6, wherein the processor
acquires an image of the companion uploaded from a communication device in which an image captured by a digital camera possessed by the companion is stored, and
uses information on a device type of the digital camera, included in accessory information on each of the images, as the identifier.

8. The image presentation system according to claim 6, wherein the processor
acquires an image of the companion uploaded from a communication device in which an image captured by a digital camera possessed by the companion is stored, and
uses information on the companion set in an uploading dedicated application for uploading the plurality of images from the communication device, as the identifier.

9. An image presentation system comprising a processor, wherein the processor:
acquires a plurality of images captured by a plurality of participants who participate in an event and one or more companions who accompany the event;
stores the plurality of images in an image storage;
analyzes each of the plurality of images stored in the image storage;
assigns analysis tag information to each of the images on the basis of an analysis result of each of the images;
assigns, to each image of the plurality of images before being acquired, an identifier of a person who captures each image;
determines a preference of each of the participants on the basis of the identifier of each of the plurality of participants and the analysis result of each of the images;
acquires designation tag information that is tag information designated by each of the participants as a command of each of the participants;
extracts an image to which analysis tag information that matches the designation tag information designated by each of the participants is assigned and which matches the preference of each of the participants, from the plurality of images stored in the image storage section, as an extraction image for each of the participants; and
presents the extraction image for each of the participants to each of the participants.

10. The image presentation system according to claim 9, wherein the processor
preferentially presents an image to which the identifier of each of the participants is assigned and an image that matches the preference of each of the participants, from the extraction images for each of the participants.

11. The image presentation system according to claim 9, wherein the processor
stores a face image of each of the participants captured by each of the participants in the image storage, and
uses the face image of each of the participants as an identifier of a person who captures the image captured by each of the participants.

12. The image presentation system according to claim 9, wherein the processor
acquires an image of each of the participants, captured by an imaging application installed in a mobile terminal with a camera possessed by each of the participants and uploaded from the imaging application, and
uses information on each of the participants stored in the mobile terminal of each of the participants as the identifier.

13. The image presentation system according to claim 9, wherein the processor
acquires an image of each of the participants uploaded from a communication device in which an image captured by a digital camera possessed by each of the participants is stored, and
uses information on each of the participants set in an uploading dedicated application for uploading the plurality of images from the communication device as the identifier.

14. The image presentation system according to claim 9, wherein the processor
acquires an image of the companion uploaded from a communication device in which an image captured by a digital camera possessed by the companion is stored, and
uses information on the companion set in an uploading dedicated application for uploading the plurality of images from the communication device as the identifier.

15. The image presentation system according to claim 9, wherein the processor
further acquires designation image information that is information on an image designated from the extraction images for each of the participants by each of the participants, as the command of each of the participants, and receives an order for at least one of downloading of an image corresponding to the designation image information from the extraction images for each of the participants or printing of the image corresponding to the designation image information.

16. The image presentation system according to claim 15, wherein the processor further
calculates a fee for the order, and
sets an image of each of the participants and an image of the companion to have different fees on the basis of the identifier to calculate the fees.

17. The image presentation system according to claim 9, wherein the processor further
selects an image on the basis of the analysis result of each of the images from the extraction images for each of the participants, as a candidate image for each of the participants,
generates a composite image for each of the participants using the candidate image for each of the participants, and
presents the composite image for each of the participants to each of the participants.

18. The image presentation system according to claim 17, wherein the processor
calculates an evaluation score of each of the images by changing an amount of weighting of evaluation of an image between an image captured by a professional cameraman who is the companion and an image captured by each of the participants on the basis of the analysis result of each of the images, and
selects an image on the basis of the evaluation score of each of the images from the extraction images for each of the participants.

19. The image presentation system according to claim 17, wherein the processor
further acquires image editing information for commanding editing of the composite image for each of the participants, as the command of each of the participants,
edits the composite image for each of the participants in accordance with the image editing information for each of the participants to generate an edited composite image for each of the participants, and
receives an order for at least one of downloading of the edited composite image for each of the participants or printing of the edited composite image.

20. An image presentation method comprising:
acquiring a plurality of images captured by a plurality of participants who participate in an event and one or more companions who accompany the event, using an image acquisition section;
storing the plurality of images, using an image storage section;
analyzing each of the plurality of images stored in the image storage section, using an image analysis section;
assigning analysis tag information to each of the images on the basis of an analysis result of each of the images, using a tag information assignment section;
acquiring designation tag information that is tag information designated by each of the participants as a command of each of the plurality of participants, using a command acquisition section;
extracting an image to which analysis tag information that matches the designation tag information designated by each of the participants is assigned from the plurality of images stored in the image storage section, as an extraction image for each of the participants, using an image extraction section;
presenting the extraction image for each of the participants to each of the participants, using an image presentation section; and
selecting an image on the basis of the analysis result of each of the images from the extraction images for each of the participants, using an image selection section, wherein
an evaluation score of each of the images is calculated by changing an amount of weighting of evaluation of an image between an image captured by the companion and an image captured by each of the participants on the basis of the analysis result of each of the images, and
an image is selected on the basis of the evaluation score of each of the images from the extraction images for each of the participants.

21. A non-transitory computer-readable recording medium having a program for causing a computer to execute each of the steps of the image presentation method according to claim 20 recorded thereon.

22. An image presentation method comprising:
acquiring a plurality of images captured by a plurality of participants who participate in an event and one or more companions who accompany the event, using an image acquisition section;
storing the plurality of images, using an image storage section;
analyzing each of the plurality of images stored in the image storage section, using an image analysis section;
assigning analysis tag information to each of the images on the basis of an analysis result of each of the images, using a tag information assignment section;
assigning, to each image before being acquired in the step of acquiring a plurality of images, an identifier of a person who captures each image, using an identifier assignment section;
determining a preference of each of the participants on the basis of the identifier of each of the plurality of participants and the analysis result of each of the images, using a preference determination section;
acquiring designation tag information that is tag information designated by each of the participants as a command of each of the participants, using a command acquisition section;
extracting an image to which analysis tag information that matches the designation tag information designated by each of the participants is assigned and which matches the preference of each of the participants, from the plurality of images stored in the image storage section, as an extraction image for each of the participants, using an image extraction section; and
presenting the extraction image for each of the participants to each of the participants, using an image presentation section.

* * * * *